United States Patent
Ishibashi

(10) Patent No.: US 10,652,429 B2
(45) Date of Patent: May 12, 2020

(54) AUTHENTICATION SYSTEM FOR INFORMATION PROCESSING APPARATUS, COMPUTER-REDABLE RECORDING MEDIUM, AND UPDATE METHOD

(71) Applicant: Yuki Ishibashi, Kanagawa (JP)

(72) Inventor: Yuki Ishibashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 143 days.

(21) Appl. No.: 15/459,067

(22) Filed: Mar. 15, 2017

(65) Prior Publication Data

US 2017/0272616 A1   Sep. 21, 2017

(30) Foreign Application Priority Data

Mar. 18, 2016  (JP) ................. 2016-056270

(51) Int. Cl.
```
H04N 1/44      (2006.01)
H04N 1/00      (2006.01)
H04N 1/32      (2006.01)
G06F 21/60     (2013.01)
G06F 21/31     (2013.01)
```
(Continued)

(52) U.S. Cl.
CPC ........... *H04N 1/4433* (2013.01); *G06F 21/31* (2013.01); *G06F 21/45* (2013.01); *G06F 21/608* (2013.01); *H04L 63/0892* (2013.01); *H04L 63/20* (2013.01); *H04N 1/00204* (2013.01); *H04N 1/00344* (2013.01); *H04N 1/32117* (2013.01); *H04N 1/4413* (2013.01); *H04N 1/4426* (2013.01); *H04N 2201/0094* (2013.01); *H04N 2201/3205* (2013.01)

(58) Field of Classification Search
None
See application file for complete search history.

(56) References Cited

U.S. PATENT DOCUMENTS

2005/0270557 A1\* 12/2005 Ookuma ............ H04N 1/00347
                                                          358/1.13
2012/0311667 A1\* 12/2012 Ohta .................... G06F 21/604
                                                             726/2

(Continued)

FOREIGN PATENT DOCUMENTS

| JP | 2012-252540 | 12/2012 |
|----|-------------|---------|
| JP | 2016-177699 | 10/2016 |
| JP | 2016-212471 | 12/2016 |

*Primary Examiner* — Mohammad H Ghayour
*Assistant Examiner* — Pawan Dhingra
(74) *Attorney, Agent, or Firm* — Harness, Dickey & Pierce, P.L.C.

(57) ABSTRACT

An information processing apparatus includes: an acquisition unit configured to acquire registration information which is stored in a master database; a registration information storage configured to store the registration information; a rule storage configured to store rule information representing an update method for synchronizing the registration information which is stored in the registration information storage with the registration information which is stored in the master database; and a synchronous processing unit configured to update the registration information which is stored in the registration information storage based on the acquired registration information and the acquired rule information which are stored in the master database.

12 Claims, 14 Drawing Sheets

(51) Int. Cl.
*G06F 21/45* (2013.01)
*H04L 29/06* (2006.01)

(56) References Cited

U.S. PATENT DOCUMENTS

2016/0269393 A1\* 9/2016 Corella ................. H04L 63/083
2016/0321443 A1\* 11/2016 Ishibashi ................. G06F 21/34

\* cited by examiner

FIG.3

| NUMBER | CONDITION | UPDATE METHOD |
|---|---|---|
| 1 | •EXIST IN USER TABLE<br>•NOT EXIST IN MASTER DATABASE | DELETION |
| 2 | •EXIST IN MASTER DATABASE<br>•NOT EXIST IN USER TABLE<br>•USER INFORMATION STORED IN MASTER DATABASE IS VALID | ADDITION<br>(NEW REGISTRATION) |
| 3 | •EXIST IN MASTER DATABASE<br>•NOT EXIST IN USER TABLE<br>•USER INFORMATION STORED IN MASTER DATABASE IS INVALID | NO PROCESSING (ADDITION (NEW REGISTRATION) IS NOT PERFORMED) |
| 4 | •EXIST IN MASTER DATABASE<br>•EXIST IN USER TABLE<br>•USER INFORMATION STORED IN MASTER DATABASE IS VALID | OVERWRITE |
| 5 | •EXIST IN MASTER DATABASE<br>•EXIST IN USER TABLE<br>•USER INFORMATION STORED IN MASTER DATABASE IS INVALID | DELETION |

FIG.4

| NUMBER | CONDITION | UPDATE METHOD |
|---|---|---|
| 1 | ·EXIST IN USER TABLE<br>·NOT EXIST IN MASTER DATABASE | DELETION |
| 2 | ·EXIST IN MASTER DATABASE<br>·NOT EXIST IN USER TABLE<br>·USER INFORMATION STORED IN MASTER DATABASE IS VALID | ADDITION<br>(NEW REGISTRATION) |
| 3 | ·EXIST IN MASTER DATABASE<br>·NOT EXIST IN USER TABLE<br>·USER INFORMATION STORED IN MASTER DATABASE IS INVALID | NO PROCESSING (ADDITION (NEW REGISTRATION) IS NOT PERFORMED) |
| 4 | ·EXIST IN MASTER DATABASE<br>·EXIST IN USER TABLE<br>·USER INFORMATION STORED IN MASTER DATABASE IS VALID | OVERWRITE |
| 5 | ·EXIST IN MASTER DATABASE<br>·EXIST IN USER TABLE<br>·USER INFORMATION STORED IN MASTER DATABASE IS INVALID | INVALIDATION |

FIG.5

| NUMBER | CONDITION | UPDATE METHOD |
|---|---|---|
| 1 | ·DELETE USER INFORMATION OF USER TABLE | DELETE ALL ASSOCIATED CARD INFORMATION ITEMS |
| 2 | ·INVALIDATE USER INFORMATION OF USER TABLE | DELETE ALL ASSOCIATED CARD INFORMATION ITEMS |

| NUMBER | CONDITION | UPDATE METHOD |
|---|---|---|
| 1 | ·DELETE USER INFORMATION OF USER TABLE | INVALIDATE ALL ASSOCIATED CARD INFORMATION ITEMS |
| 2 | ·INVALIDATE USER INFORMATION OF USER TABLE | INVALIDATE ALL ASSOCIATED CARD INFORMATION ITEMS |

FIG.14

| NUMBER | CONDITION | UPDATE METHOD |
| --- | --- | --- |
| 1 | ·DELETE USER INFORMATION OF USER TABLE | MOVE ALL ASSOCIATED CARD INFORMATION ITEMS TO INVALID CARD TABLE |
| 2 | ·INVALIDATE USER INFORMATION OF USER TABLE | MOVE ALL ASSOCIATED CARD INFORMATION ITEMS TO INVALID CARD TABLE |

AUTHENTICATION SYSTEM FOR INFORMATION PROCESSING APPARATUS, COMPUTER-REDABLE RECORDING MEDIUM, AND UPDATE METHOD

CROSS-REFERENCE TO RELATED APPLICATIONS

The present application claims priority under 35 U.S.C. § 119 to Japanese Patent Application No. 2016-056270, filed on Mar. 18, 2016. The contents of which are incorporated herein by reference in their entirety.

BACKGROUND OF THE INVENTION

1. Field of the Invention

The present invention relates to an information processing apparatus, a computer-readable recording medium, and an update method.

2. Description of the Related Art

A multifunction peripheral which requests the input of user information (a user ID and a password) at the time of being used, is known. Such a multifunction peripheral transmits an authentication request including the input user information to an authentication device, that is an information processing apparatus, through a network, and receives an authentication result of whether or not the user is proper from the authentication device. The authentication device stores the user information of each user in a storage unit, and in a case where the authentication request is received from an equipment, the authentication device determines whether or not the user is proper by comparing the user information stored in the storage unit with the user information included in the authentication request.

There is a case where such an authentication device periodically synchronizes the user information which is stored in the storage unit with a master database which is stored in an external server. In this case, the authentication device acquires the user information which is stored in the master database, and directly overwrites the acquired user information in the storage unit.

In Japanese Unexamined Patent Application Publication No. 2012-252540, a method of synchronizing data between authentication devices is disclosed. Specifically, the synchronization of the data intends that both devices retain the same data.

Here, in the operation of the authentication device, there is also a case where it is not required to be coincident with the contents of the master database according to the item of the user information. However, the authentication device of the related art overwrites the user information with the contents of the master database at the time of performing the synchronization, and thus, it is not possible to perform handling other than allowing the user information to be coincident with the contents of the master database at the time of performing the synchronization. Accordingly, in such an authentication device, in a case where the contents of the user information synchronized with the contents of the master database are intended to be changed, an administrator or the like has to manually perform a change operation after performing the synchronization.

In consideration of such circumstances described above, there is a need to control a plurality of update methods with respect to registration information at the time of performing synchronous processing with respect to registration information which is stored.

SUMMARY OF THE INVENTION

According to exemplary embodiments of the present invention, there is provided an information processing apparatus, comprising: an acquisition unit configured to acquire registration information which is stored in a master database; a registration information storage configured to store the registration information; a rule storage configured to store rule information representing an update method for synchronizing the registration information which is stored in the registration information storage with the registration information which is stored in the master database; and a synchronous processing unit configured to update the registration information which is stored in the registration information storage based on the acquired registration information and the acquired rule information which are stored in the master database.

Exemplary embodiments of the present invention also provide a non-transitory computer-readable recording medium that contains a computer program that is implemented in an information processing apparatus including a processor, a registration information storage, and a rule storage, the computer program causes the processor to execute: acquiring registration information which is stored in a master database; acquiring rule information representing an update method for synchronizing the registration information which is stored in the registration information storage with the registration information which is stored in the master database from the rule storage, and updating the registration information which is stored in the registration information storage based on the acquired registration information and the acquired rule information which are stored in the master database.

Exemplary embodiments of the present invention also provide an update method for an information processing apparatus including a processor, a registration information storage, and a rule storage, the method comprising: acquiring, by the processor, registration information which is stored in a master database; acquiring, by the processor, rule information representing an update method for synchronizing the registration information which is stored in the registration information storage with the registration information which is stored in the master database from the rule storage, and updating, by the processor, the registration information which is stored in the registration information storage based on the acquired registration information and the acquired rule information which are stored in the master database.

BRIEF DESCRIPTION OF THE DRAWINGS

FIG. 3 is a diagram illustrating a first example of rule information for updating user information;

FIG. 4 is a diagram illustrating a second example of the rule information for updating the user information;

FIG. 5 is a diagram illustrating an example of rule information for updating card information;

FIG. 14 is a diagram illustrating an example of rule information for updating card information according to the fourth embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
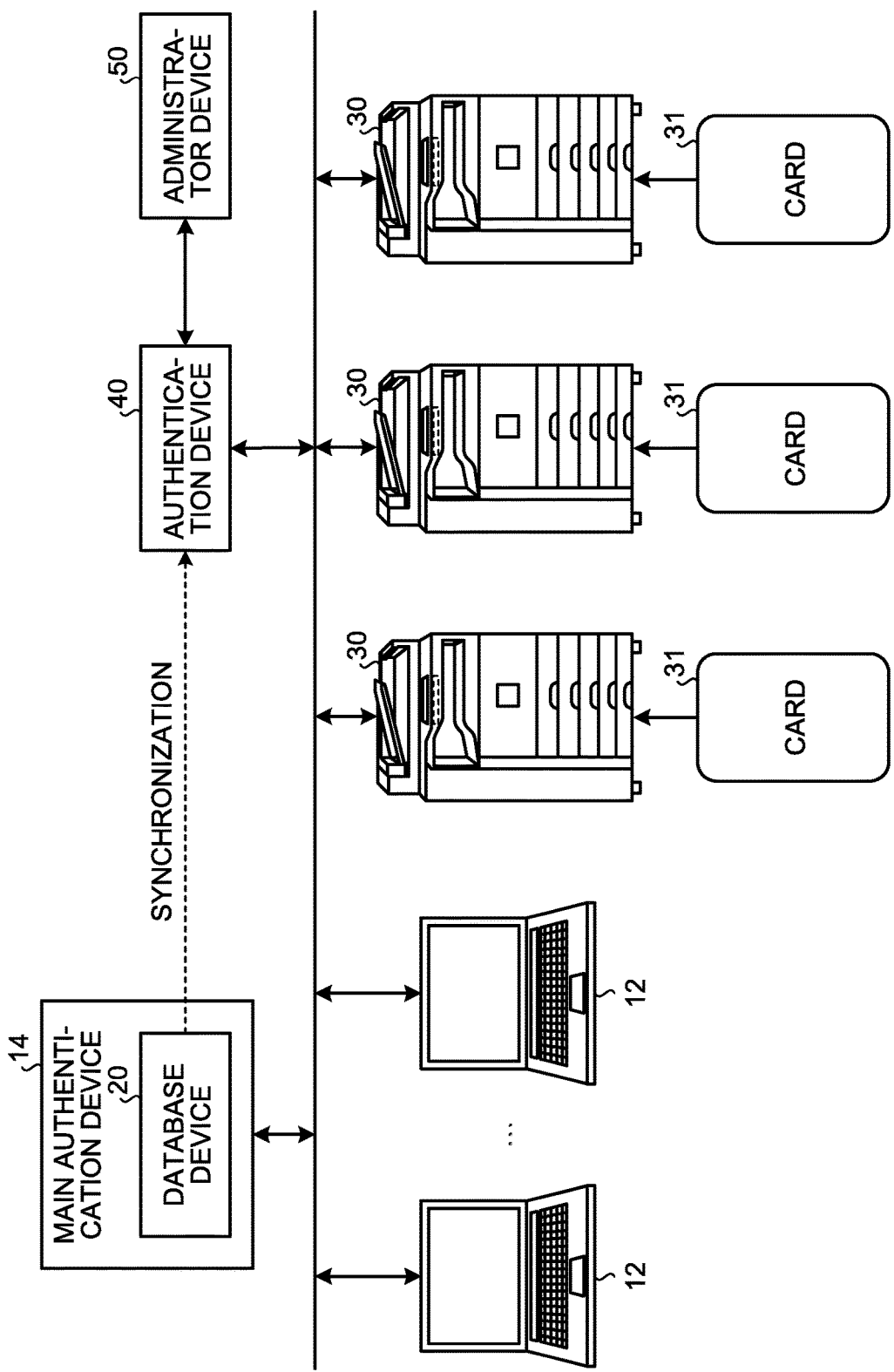
FIG. 1 is a diagram illustrating an authentication system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Hereinafter, embodiments according to the present invention will be described in detail with reference to the drawings. The present invention is not limited by such embodiments.

First Embodiment

FIG. 1 is a diagram illustrating an authentication system 10 according to a first embodiment. The authentication system 10 includes at least one client device 12, a main authentication device 14, at least one equipment 30, an authentication device (an information processing apparatus) 40, and an administrator device 50.

Each of the devices included in the authentication system 10 are connected to each other through a network. The network, for example, is a local area network (LAN), a virtual private network (VPN), or a wide area network (WAN) to which the LAN is connected through a router. The network may include the internet, a telephone communication line, or the like. The network may be configured in a wired manner, or a part or all of the network may be configured in a wireless manner.

The client device 12 is an information processing terminal which is used by a user and is capable of being connected to the network. The client device 12, for example, is a tablet, a smart phone, a computer, or the like. The client device 12 may be the other electronic device, insofar as the electronic device is used by the user and is capable of being connected to the network.

The main authentication device 14 authenticates the user using the client device 12, or the like. For example, the main authentication device 14 receives an authentication request of user information which is input by the user from the client device 12, and confirms whether or not the received user information is proper (whether or not the received user information exists). Then, the main authentication device 14 returns an authentication result to the client device 12. The client device 12 accepts the use of the user or restricts the use of the user based on the authentication result which is received from the main authentication device 14.

The main authentication device 14 includes a database device 20. The database device 20 stores registration information (for example, the user information) which is an authentication target of the client device 12. The main authentication device 14 compares the registration information which is stored in the database device 20 with the user information which is included in the authentication request, and confirms whether or not the received user is proper.

The database device 20 is configured of one or a plurality of computers. The database device 20 may be a server device on a network. The database device 20 stores a master database which stores a plurality of registration information items.

In this embodiment, the master database stores the user information as the registration information. More specifically, the master database stores the user information with respect to each of a plurality of users using the equipment 30. The master database, for example, may be an active directory, a lightweight directory access protocol (LDAP) server, or the like. The master database may store group information including information relevant to a group, or the like as the registration information, instead of the user information.

The equipment 30 is operated by the user. The equipment 30 is connected to the authentication device 40 through the network. The equipment 30 is an electronic apparatus which executes a predetermined function. The equipment 30 is, for example, a multifunction peripheral (MFP). The equipment 30 may be a printer, a copier, a scanner, a facsimile machine, a projector, a camera, an air conditioner, a refrigerator, a lighting device, a tablet, a smart phone, a computer, or the like.

The equipment 30, for example, can be used in common by the user using the client device 12. The user inputs the user information of the user own into the equipment 30 before using the equipment 30. The equipment 30 acquires the user information which is input from the user. For example, the equipment 30 allows the user to input the user information (for example, a user logon name, a password, and the like) through an operation input panel or the like.

The equipment 30 transmits the authentication request including the user information or information associated with the user information to the authentication device 40 through the network, and receives an authentication result of whether or not the user is proper from the authentication device 40. In a case where an authentication result representing that the user is proper is received from the authentication device 40, the equipment 30 permits the user to use a function. In contrast, in a case where an authentication result representing that the user is not proper is received, the equipment 30 prohibits the use of the user.

The equipment 30 may acquire device information which is stored in a portable device from the portable device carried by the user. The device information is associated with any user information. The equipment 30 transmits the authentication request including the device information which is acquired from the portable device to the authentication device 40, and receives an authentication result representing whether or not the user information associated with the device information is proper.

In this embodiment, the portable device is a card 31. In this embodiment, the equipment 30 includes a card reader which reads information from the card 31. In a case where the equipment 30 is used by the user, the user allows the card reader to read the card 31 which is possessed by the user own, and thus, allows the equipment 30 to acquire card information, which is an example of the device information. Then, the equipment 30 transmits the authentication request including the card information which is acquired from the card 31 to the authentication device 40, and receives an authentication result representing whether or not the user information associated with the card information is proper.

The equipment 30 may read the card information from the card 31, and may allow the user information (for example, the password) to be input through the operation input panel or the like. In this case, the equipment 30 transmits the authentication request including the card information and the user information (for example, the password), and receives an authentication result representing whether or not the card information and the user information (for example, the password) are proper in the authentication device 40. The portable device is not limited to the card 31, but may be a device (for example, an RF tag) which transmits the device information in a wireless manner.

The authentication device 40 is configured of one or a plurality of computers. The database device 20 may be a server device installed on a network. The authentication device 40 authenticates the user using the equipment 30. The authentication device 40 not only authenticates the user using the equipment 30, but also is capable of controlling use authority (for example, use frequency, used hours, or accounting processing) or the like of each user. Accordingly, the main authentication device 14 is a general user authentication device with respect to the client device 12 which is provided in the authentication system 10, whereas the authentication device 40 is a dedicated device which is specialized in the use of the equipment 30.

The authentication device 40 stores the user information with respect to each of the plurality of users using the equipment 30. The authentication device 40 stores the card information (the device information) with respect to each of a plurality of cards 31. The card information is associated with any card 31. The card information includes information relevant to the corresponding card 31. Valid card information is associated with the user information which is associated with the user possessing the card 31. The authentication device 40 synchronizes the user information which is stored with the user information which is stored in the master database stored in the database device 20, for example, periodically or at a designated timing.

In a case where the authentication request including the user information or the like is received from any equipment 30, the authentication device 40 authenticates whether or not the received user information is proper. The authentication device 40, for example, determines whether or not the user information included in the authentication request is coincident with the user information which is stored. It is determined whether or not the card information included in the authentication request is coincident with any valid card information which is stored. In a case where the card information included in the authentication request is coincident with any valid card information which is stored, the authentication device 40 transmits an authentication result representing that the user is proper to the equipment 30 which is a transmission source of the authentication request. In a case where the card information included in the authentication request is not coincident with any valid card information which is stored, the authentication device 40 transmits an authentication result representing that the user is not proper to the equipment 30 which is the transmission source of the authentication request.

The administrator device 50 is a computer which is used by an administrator. The administrator device 50 is connected to the authentication device 40 through the network. The administrator device 50 performs an operation request of the user information, various settings, and the like with respect to the authentication device 40 according to the operation of the administrator.

Figure 2:
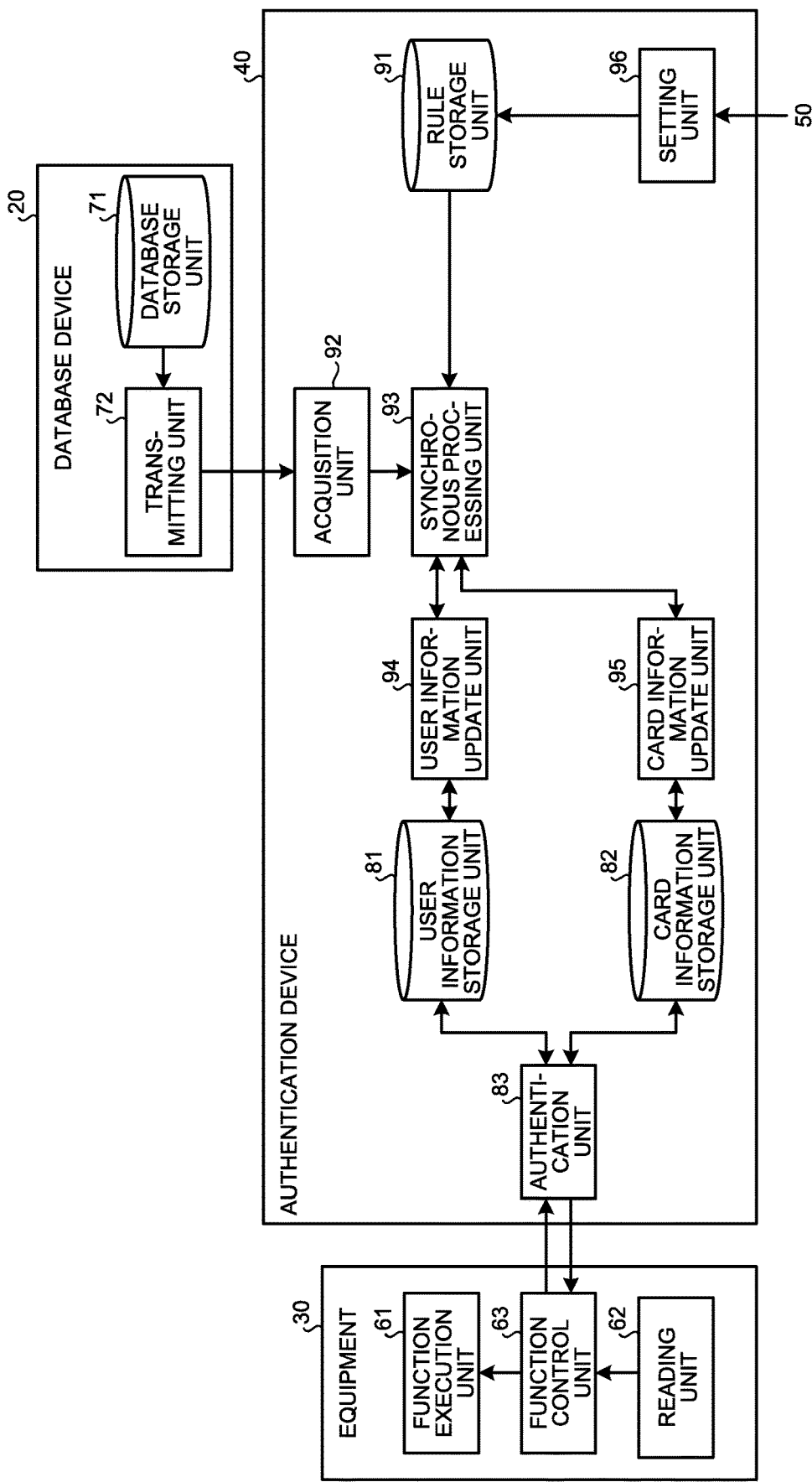
FIG. 2 is a diagram illustrating function configurations of an equipment, a database device, and an authentication device (an information processing apparatus) according to the first embodiment.

FIG. 2 is a diagram illustrating function configurations of the equipment 30, the database device 20, and the authentication device 40 according to the first embodiment. The equipment 30 includes a function execution unit 61, a reading unit 62, and a function control unit 63.

The function execution unit 61 executes the function of the equipment 30. For example, in a case where the equipment 30 is a multifunction peripheral, the function execution unit 61 executes a printing function, a scan function, and the like. The reading unit 62 reads the card information from the card 31.

The function control unit 63 transmits the authentication request to the authentication device 40. The authentication request includes the user information which is input by the user, the card information which is read from the card 31, or both of the user information and the card information. The function control unit 63 receives an authentication result representing whether or not the user inputting the user information or the user possessing the card 31 is proper from the authentication device 40. In a case where an authentication result representing that the user is proper is received, the equipment 30 operates the function execution unit 61 normally, and permits the user to use the function. In contrast, in a case where an authentication result representing that the user is not proper is received, the equipment 30 restricts the operation of the function execution unit 61, and prohibits the user from using the function.

The database device 20 includes a database storage unit 71 and a transmitting unit 72. The database storage unit 71 stores the master database. The transmitting unit 72 transmits the information which is stored in the master database to the authentication device 40 according to the request from the authentication device 40.

Here, the master database stores the user information including information relevant to each of the users, as shown in Table 1 and Table 2 described below, with respect to each of the users. Table 1 shows information items included in the user information which is stored in the master database. Table 2 shows a specific example of the user information which is stored in the master database.

TABLE 1

| Item name | Description |
|---|---|
| User logon name | User name to be input at time of performing authentication |
| Password | Password to be input at time of performing authentication |
| User display name | User name displayed on UI |
| E-mail address | E-mail address |
| Valid flag | Represent whether user information is valid or invalid |

TABLE 2

| User logon name | Password | User display name | E-mail address | Valid flag |
|---|---|---|---|---|
| usera | 12345678 | User-A | User-A@kaisha.com | ON |
| userb | 87654321 | User-B | User-B@kaisha.com | OFF |
| userc | abcdefgh | User-C | User-C@kaisha.com | ON |
| . . . | | | | |

As shown in Table 1 and Table 2, the user information which is stored in the master database includes a user logon name, a password, a user display name, an e-mail address, and a valid flag. The user logon name is a user name which is input into the equipment 30 by the user at the time of performing the authentication. The password is a password which is input into the equipment 30 by the user at the time of performing the authentication. The user display name is a user name which is displayed on a user interface (UI). The e-mail address is an address of an electronic mail of the user.

The valid flag is information representing whether or not the user information is valid. In a case where the valid flag is turned on, the valid flag represents that the user information is valid. In a case where the valid flag is turned off, the valid flag represents that the user information is invalid.

The authentication device 40 includes a user information storage unit 81 (a registration information storage unit), a card information storage unit 82 (a device information storage unit), an authentication unit 83, a rule storage unit 91, an acquisition unit 92, a synchronous processing unit 93, a user information update unit 94, a card information update unit 95, and a setting unit 96.

The user information storage unit 81 stores a user table. The user table stores the user information as shown in Table 3 and Table 4 described below with respect to each of the users. Table 3 shows information items included in the user information which is stored in the user table. Table 4 shows a specific example of the user information which is stored in the user table.

TABLE 3

| Item name | Description |
|---|---|
| User ID | Number capable of uniquely identifying user information |
| User logon name | User name to be input at time of performing authentication. |
| Password | Password to be input at time of performing authentication |

TABLE 3-continued

| Item name | Description |
|---|---|
| Display name | User name displayed on UI |
| E-mail transmission destination | E-mail address |
| Valid flag | Representation whether user information is valid or invalid |

TABLE 4

| User ID | User logon name | Password | Display name | E-mail transmission destination | Valid flag |
|---|---|---|---|---|---|
| 0001 | usera | 12345678 | User-A | User-A@kaisha.com | ON |
| 0002 | userb | 87654321 | User-B | User-B@kaisha.com | OFF |
| 0003 | userc | abcdefgh | User-C | User-C@kaisha.com | ON |
| . . . | | | | | |

As shown in Table 3 and Table 4, the user information which is stored in the user table includes a user ID, a user logon name, a password, a display name, an e-mail transmission destination, and a valid flag. The user ID is a number which is capable of uniquely identifying the user information. The user logon name is a user name which is input into the equipment 30 by the user at the time of performing the authentication. The password is a password which is input into the equipment 30 by the user at the time of performing the authentication. The display name is a user name which is displayed on a user interface (UI). The e-mail transmission destination is an address of an electronic mail of the user.

The valid flag is information representing whether or not the user information is valid. In a case where the valid flag is turned on, the valid flag represents that the user information is valid. In a case where the valid flag is turned off, the valid flag represents that the user information is invalid.

The card information storage unit 82 stores a card table. The card table stores the card information which is associated with each of the cards 31, as shown in Table 5 and Table 6 described below, with respect to each of the cards 31. Table 5 shows information items included in the card information which is stored in the card table. Table 6 shows a specific example of the card information which is stored in the card table.

TABLE 5

| Item name | Description |
|---|---|
| Card ID | Number capable of uniquely identifying card |
| Login user name | User logon name included in user information associated with card information |
| Start date of use | Start date of validity period |
| End date of use | End date of validity period |

TABLE 6

| Card ID | Login user name | Start date of use | End date of use |
|---|---|---|---|
| 0001 | usera | 1990 Apr. 1 | 2016 Mar. 31 |
| 0002 | userb | 1970 Apr. 1 | 2007 Mar. 31 |
| 0003 | userc | 2000 Apr. 1 | 2016 Mar. 31 |
| . . . | | | |

As shown in Table 5 and Table 6, the card information which is stored in the card table includes a card ID, a login user name, a start date of use, and an end date of use. The card ID is a number which is capable of uniquely identifying the card information. The login user name is a user logon name included in the user information which is associated with the card information. It is possible to identify the user possessing the corresponding card 31 by the login user name. The start date of use is a start date of a validity period of the card 31. The end date of use is an end date of the validity period of the card 31.

The authentication unit 83 receives the authentication request including the user information which is input by the user, the authentication request including the card information which is read from the card 31, or the authentication request including both of the user information and the card information from the equipment 30. Then, the authentication unit 83 authenticates the information included in the authentication request by the information which is stored in the user information storage unit 81 and the card information storage unit 82, and returns an authentication result representing whether or not the user using the equipment 30 is proper, to the equipment 30 which is the transmission source of the authentication request.

For example, in a case where the authentication request including the user information is received, the authentication unit 83 determines whether or not the user information included in the authentication request is coincident with any valid user information which is stored in the user information storage unit 81. Then, in a case where the user information included in the authentication request is coincident with any valid user information which is stored in the user information storage unit 81, the authentication unit 83 transmits an authentication result representing that the user using the equipment 30 is proper, and in a case where the user information included in the authentication request is not coincident with any valid user information which is stored in the user information storage unit 81, the authentication unit 83 transmits an authentication result representing that the user using the equipment 30 is not proper. In a case where the authentication request including the card information is received, the authentication unit 83 determines whether or not the card information included in the authentication request is coincident with valid card information (the card information associated with the user information) which is stored in the card information storage unit 82. Then, in a case where the card information included in the authentication request is coincident with the valid card information which is stored in the card information storage unit 82, the authentication unit 83 transmits an authentication result representing that the user using the equipment 30 is proper, and in a case where the card information included in the authentication request is not coincident with the valid card information which is stored in the card information storage unit 82, the authentication unit 83 transmits an authentication result representing that the user using the equipment 30 is not proper.

The rule storage unit 91 stores rule information. The rule information represents an update method for synchronizing the user information which is stored in the user information storage unit 81 with the user information which is stored in the master database. The rule information may represent an update method of updating the card information which is stored in the card information storage unit 82 at the time of synchronizing the user information. The details of the rule information will be described below.

The acquisition unit 92 acquires the user information which is stored in the master database from the database device 20. For example, the acquisition unit 92 accesses the database device 20 through the network, and receives the user information which is stored in the master database through the network.

The synchronous processing unit 93 updates the user information which is stored in the user information storage unit 81 based the user information stored in the master database, which is acquired by the acquisition unit 92, and the rule information stored in the rule storage unit 91. The synchronous processing unit 93 may also update the card information which is stored in the card information storage unit 82 based on the rule information stored in the rule storage unit 91, at the time of synchronizing the user information.

The synchronous processing unit 93 executes synchronous processing periodically or at a timing which is designated by the administrator. For example, the synchronous processing unit 93 executes the synchronous processing every day (for example, at night). For example, the synchronous processing unit 93 executes the synchronous processing at the timing which is designated by the administrator.

The user information items (Table 1) which are stored in the master database and the user information items (Table 3) which are stored in the user table have a correspondence relationship as shown in Table 7 described below. That is, the user logon name of the master database corresponds to the user logon name of the user table. The password of the master database corresponds to the password of the user table. The user display name of the master database corresponds to the display name of the user table. The e-mail address of the master database corresponds to the e-mail transmission destination of the user table. The valid flag of the master database corresponds to the valid flag of the user table.

TABLE 7

| Master database | User table |
| --- | --- |
| User logon name | User Logon name |
| Password | Password |
| User display name | Display name |
| E-mail address | E-mail transmission destination |
| Valid flag | Valid flag |

The synchronous processing unit 93 updates the values of the user logon name, the password, the display name, the e-mail transmission destination, and the valid flag in the user table with respect to each of the user information items, based on the values of the corresponding items of the master table shown in Table 7.

The user information update unit 94 updates the user information which is stored in the user information storage unit 81 according to an instruction from the synchronous processing unit 93. The card information update unit 95 updates the card information which is stored in the card information storage unit 82 according to the instruction from the synchronous processing unit 93.

The setting unit 96 sets the rule information according to an instruction from the administrator device 50, and stores the rule information in the rule storage unit 91.

FIG. 3 is a diagram illustrating a first example of the rule information for updating the user information. The rule storage unit 91, for example, stores first rule information as illustrated in FIG. 3. The first rule information represents five conditions of a first condition to a fifth condition, and update methods which are executed in a case where each of the conditions is satisfied.

In the first section, a condition is represented in which the user information exists in the user table, and the corresponding user information (the user information having the same user logon name) does not exist in the master database. An update method in the case of satisfying the first condition, represents that the corresponding user information which is stored in the user table is deleted.

In the second section, a condition is represented in which the user information exists in the master database, the corresponding user information (the user information having the same user logon name) does not exist in the user table, and the corresponding user information which is stored in the master database is valid (the valid flag is turned on). An update method in the case of satisfying the second condition, represents that the corresponding user information is added (newly registered) to the user table. In a case where the update is performed by such a method, the user information is added to the user table, and in the added user information, items other than the user ID become the same values as those of the corresponding user information which is stored in the master database.

In the third section, a condition is represented in which the user information exists in the master database, the corresponding user information (the user information having the same user logon name) does not exist in the user table, and the corresponding user information which is stored in the master database is invalid (the valid flag is turned off). An update method in the case of satisfying the third condition, represents that no processing is performed. That is, in a case where the third condition is satisfied, new user information is not added (newly registered) to the user table, and the existing user information of the user table is not also changed.

In the fourth section, a condition is represented in which the user information exists in the master database, the corresponding user information (the user information having the user logon name) exists in the user table, and the corresponding user information which is stored in the master database is valid (the valid flag is turned on). An update method in the case of satisfying the fourth condition, represents that the corresponding user information of the user table is overwritten with the contents of the user information stored in the master database. In a case where the update is performed by such a method, in the corresponding user information of the user table, items other than the user ID become the same values as those of the corresponding user information which is stored in the master database.

In the fifth section, a condition is represented in which the user information exists in the master database, the corresponding user information (the user information having the same user logon name) exists in the user table, and the corresponding user information which is stored in the master database is invalid (the valid flag is turned off). An update method in the case of satisfying the fifth condition, represents that the corresponding user information which is stored in the user table is deleted.

In a case where the first rule information as illustrated in FIG. 3 is set by the setting unit 96, the synchronous processing unit 93 executes update processing with respect to the user information which is stored in the user information storage unit 81 according to the first rule information at the time of performing the synchronization.

FIG. 4 is a diagram illustrating a second example of the rule information for updating the user information. The rule storage unit 91, for example, may store the second rule information as illustrated in FIG. 4. The second rule information represents five conditions of a first condition to a fifth condition, and update methods which are executed in a case where each of the conditions is satisfied.

The first condition to the fourth condition and the update method of the second rule information are identical to those of the first rule information illustrated in FIG. 3. That is, the second rule information is different from the first rule information in the fifth condition and the update method.

In the fifth section of the second rule information, a condition is represented in which the user information exists in the master database, the corresponding user information (the user information having the same user logon name) exists in the user table, and the corresponding user information which is stored in the master database is invalid (the valid flag is turned off). An update method in the case of satisfying the fifth condition of the second rule information, represents that the corresponding user information which is stored in the user table is set to be invalid (the valid flag is turned off). In a case where the update is performed by such a method, in the corresponding user information of the user table, items other than the user ID become the same values as those of the corresponding user information which is stored in the master database.

In a case where first rule information as illustrated in FIG. 4 is set by the setting unit 96, the synchronous processing unit 93 executes the update processing with respect to the user information which is stored in the user information storage unit 81 according to the second rule information at the time of performing the synchronization.

FIG. 5 is a diagram illustrating the rule information for updating the card information. The rule storage unit 91, for example, may store the rule information for updating the card information, as illustrated in FIG. 5, in addition to the rule information illustrated in FIG. 3 or FIG. 4. The rule information for updating the card information, illustrated in FIG. 5, represents two conditions of a first condition and a second condition, and update methods which are executed in a case where each of the conditions is satisfied.

In the first section of the rule information for updating the card information, a condition is represented in which the user information of the user table is deleted. An update method in the case of satisfying the first condition, represents that all card information items which are associated with the deleted user information are deleted. Specifically, the card information which is associated with the deleted user information is card information of which the user logon name included in the deleted user information is included in the login user name.

In the second section of the rule information for updating the card information, a condition is represented in which the user information of the user table is set to be invalid. That is, in the second section, a condition is represented in which the valid flag of the user information is turned off. In an update method in the case of satisfying the second condition, it is represented that all card information items which are associated with the deleted user information are deleted.

In a case where the rule information as illustrated in FIG. 5 is set by the setting unit 96, the synchronous processing unit 93 executes the update processing with respect to the card information which is stored in the card information storage unit 82 according to the rule information illustrated in FIG. 5 at the time of performing the synchronization.

Figure 6:
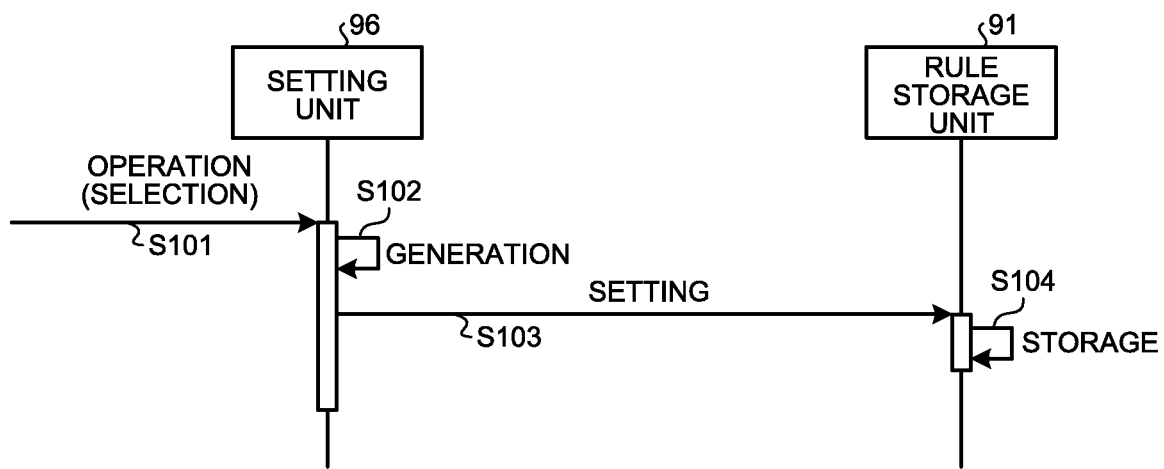
FIG. 6 is a sequence diagram illustrating a flow of processing at the time of setting the rule information.

FIG. 6 is a sequence diagram illustrating the flow of processing at the time of setting the rule information. In a case where the rule information is set, the authentication device 40 executes the processing according to the flow illustrated in FIG. 6.

First, the setting unit 96 accepts an input operation of the information which is required for preparing the rule information (step S101). For example, the setting unit 96 displays a user interface screen for preparing the rule information, and for example, and accepts information required for preparing the rule information as illustrated in FIG. 3, FIG. 4, or FIG. 5. For example, the setting unit 96 may display a screen for selecting any one of the first rule information illustrated in FIG. 3 and the second rule information illustrated in FIG. 4, and may select any one of the first rule information and the second rule information.

Subsequently, the setting unit 96 generates rule information based on the input information (step S102). The rule information may be in a data format insofar as the data format can be interpreted by the synchronous processing unit 93. For example, the rule information is described by an extensible markup language (XML).

Subsequently, the setting unit 96 imparts the generated rule information to the rule storage unit 91 (step S103). Subsequently, the rule storage unit 91 stores the received rule information in a predetermined folder which can be read by the synchronous processing unit 93 (step S104). By the processing described above, the authentication device 40 is capable of setting the rule information.

Figure 7:
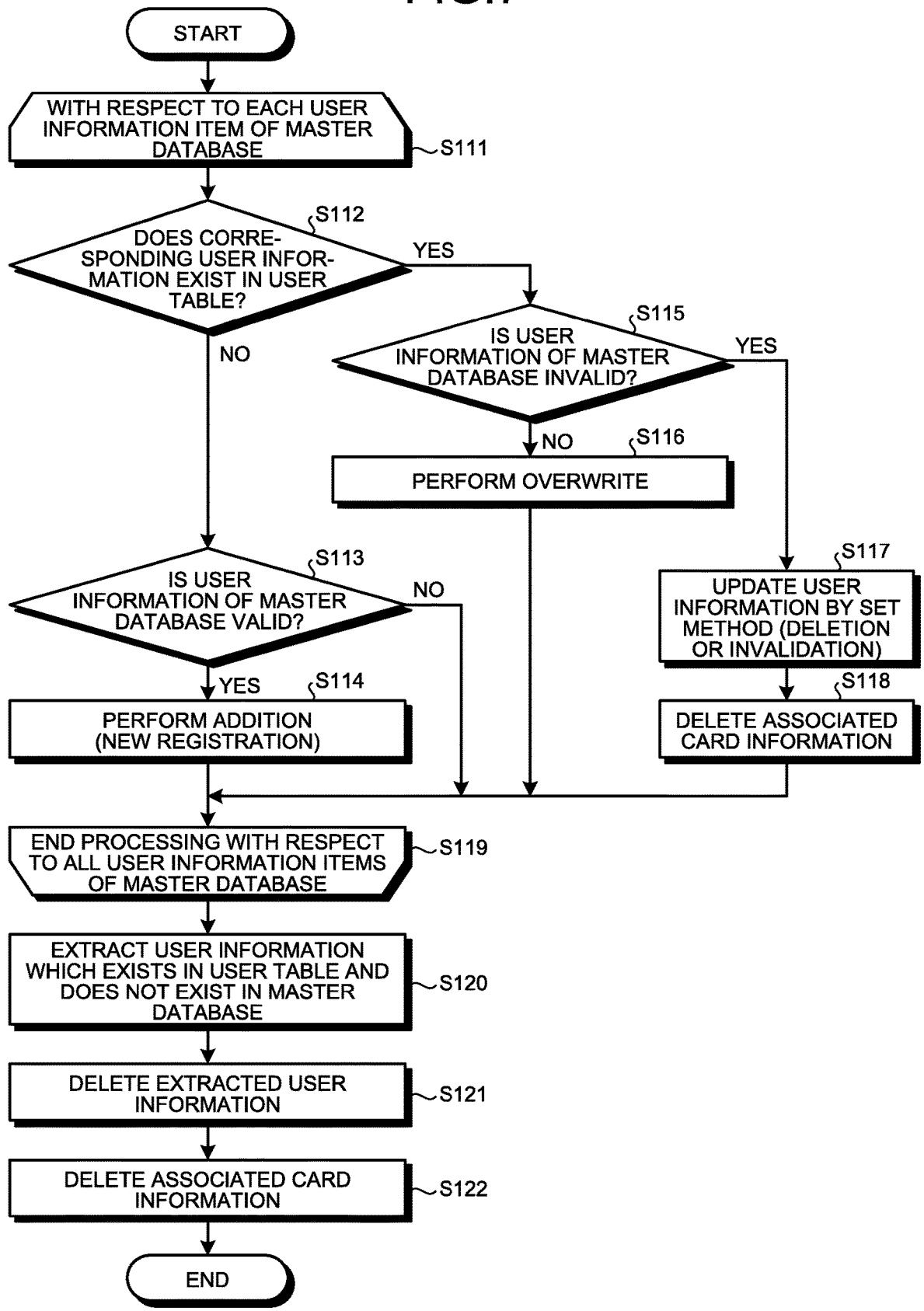
FIG. 7 is a flowchart illustrating update processing in the first embodiment.

FIG. 7 is a flowchart illustrating the update processing of the first embodiment. In a case where the update processing is performed based on the rule information illustrated in FIG. 3 or FIG. 4 and the rule information illustrated in FIG. 5, the synchronous processing unit 93, for example, executes the processing according to the flow illustrated in FIG. 7.

First, the synchronous processing unit 93 executes loop processing between step S111 and step S119 for each of the user information items stored in the master database which is acquired by the acquisition unit 92.

In the loop processing, first, in step S112, the synchronous processing unit 93 determines whether or not the corresponding user information (the user information having the same user logon name) exists in the user table with respect to target user information which is stored in the master database.

In a case where the corresponding user information does not exist in the user table (No at step S112), the synchronous processing unit 93 allows the processing to proceed to step S113. In a case where the corresponding user information exists in the user table (Yes at step S112), the synchronous processing unit 93 allows the processing to proceed to S115.

In S113, the synchronous processing unit 93 determines whether or not the target user information which is stored in the master database is valid. That is, in S113, the synchronous processing unit 93 determines whether or not the valid flag included in the target user information which is stored in the master database is turned on.

In a case where the target user information which is stored in the master database is not valid (that is, in a case where the target user information which is stored in the master database is invalid) (No at step S113), the synchronous processing unit 93 allows the processing to proceed to step S119 without executing any processing. That is, here, the synchronous processing unit 93 executes the update processing in the case of satisfying the third condition of FIG. 3 or FIG. 4.

In a case where the target user information which is stored in the master database is valid (Yes at step S113), in step S114, the synchronous processing unit 93 adds (newly registers) the corresponding user information to the user table. That is, in step S114, the synchronous processing unit 93 executes the update processing in the case of satisfying the second condition of FIG. 3 or FIG. 4. In a case where S114 ends, the synchronous processing unit 93 allows the processing to proceed to step S119.

In step S115, the synchronous processing unit 93 determines whether or not the target user information which is stored in the master database is invalid. That is, in step S115, the synchronous processing unit 93 determines whether or not the valid flag included in the target user information which is stored in the master database is turned off.

In a case where the target user information which is stored in the master database is not invalid (that is, in a case where the target user information which is stored in the master database is valid) (No at step S115), in step S116, the synchronous processing unit 93 overwrites the corresponding user information of the user table with the contents of the user information stored in the master database. That is, in step S116, the synchronous processing unit 93 executes the update processing in the case of satisfying the fourth condition of FIG. 3 or FIG. 4. In a case where step S116 ends, the synchronous processing unit 93 allows the processing to proceed to step S119.

In a case where the target user information which is stored in the master database is invalid (that is, in a case where the target user information which is stored in the master database is not valid) (Yes at step S115), in step S117, the synchronous processing unit 93 updates the corresponding user information of the user table by the set method. Specifically, in a case where the first rule information of FIG. 3 is applied, the synchronous processing unit 93 deletes the corresponding user information which is stored in the user table. That is, the synchronous processing unit 93 executes the update processing in the case of satisfying the fifth condition of FIG. 3. In a case where the second rule information of FIG. 4 is applied, the synchronous processing unit 93 sets the corresponding user information which is stored in the user table to be invalid (turns off the valid flag). That is, the synchronous processing unit 93 executes the update processing in the case of satisfying the fifth condition of FIG. 4. In a case where step S117 ends, the synchronous processing unit 93 allows the processing to proceed to step S118.

In step S118, the synchronous processing unit 93 extracts all card information items which are associated with the user information which is set to be deleted or invalid in step S117 from the card table, and deletes all of the extracted card information items. That is, the synchronous processing unit 93 executes the update processing in the case of satisfying the first condition and the second condition of FIG. 5. In a case step S118 ends, the synchronous processing unit 93 allows the processing to proceed to step S119.

In step S119, the synchronous processing unit 93 determines whether or not the loop processing between step S111 and step S119 ends with respect to all user information items included in the master database. In a case where the processing does not end with respect to all of the user information items, the synchronous processing unit 93 allows the processing to return to step S111, and repeats the processing from step S112 with respect to the next user information. In a case where the processing ends with respect to all of the user information items, the synchronous processing unit 93 allows the processing to proceed to step S120.

In step S120, the synchronous processing unit 93 extracts all of the user information items which exist in the user table and do not exist in the master database. Subsequently, in step S121, the synchronous processing unit 93 deletes all of the user information items which are extracted in step S120 from the user table. That is, the synchronous processing unit 93 executes the processing in the case of satisfying the first condition of FIG. 3 or FIG. 4. In a case where step S121 ends, the synchronous processing unit 93 allows the processing to proceed to step S122.

Subsequently, in step S122, the synchronous processing unit 93 extracts the card information associated with the user information which is deleted in step S120 from the card table, and deletes all of the extracted card information. That is, the synchronous processing unit 93 executes the update processing in the case of satisfying the first condition of FIG. 5.

In a case where the processing of step S122 ends, the synchronous processing unit 93 ends this flow. By executing the processing described above, the synchronous processing unit 93 is capable of executing the processing according to the rule information illustrated in FIG. 3 or FIG. 4, and FIG. 5.

Figure 8:
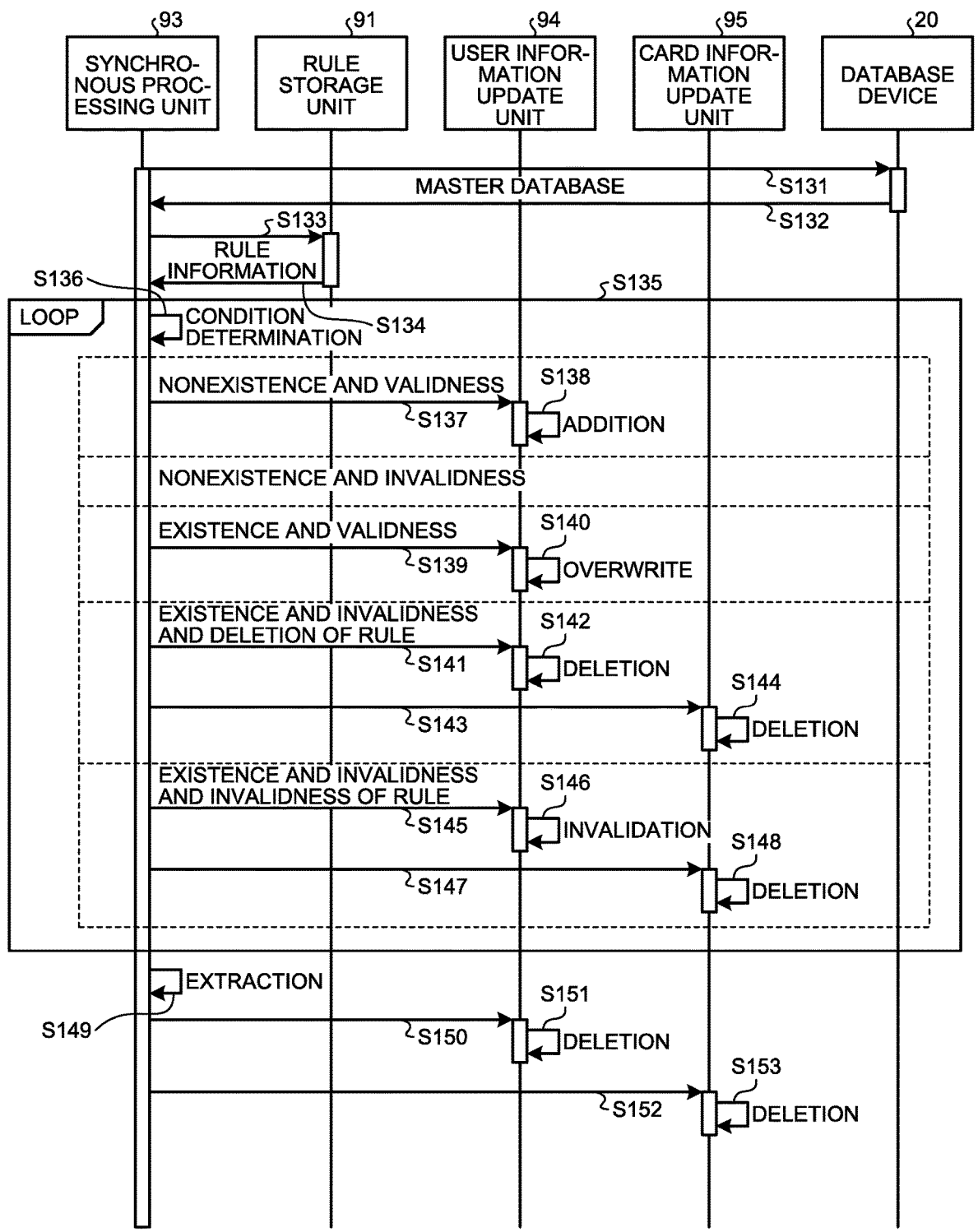
FIG. 8 is a sequence diagram illustrating a flow at the time of performing synchronous processing in the first embodiment.

FIG. 8 is a sequence diagram illustrating a flow at the time of performing the synchronous processing in the authentication device 40 according to the first embodiment. The authentication device 40 executes the synchronous processing in the sequence illustrated in FIG. 8 periodically (for example, at night) or at a timing which is designated by the administrator.

First, the synchronous processing unit 93 accesses the database device 20 through the acquisition unit 92, and acquires all of the user information items which are stored in the master database (step S131 and step S132). Subsequently, the synchronous processing unit 93 accesses the rule storage unit 91, and acquires the rule information which is currently set (step S133 and step S134).

Subsequently, the synchronous processing unit 93 executes the loop processing of step S135 with respect to a plurality of user information items included in the master database.

In the loop processing, first, the synchronous processing unit 93 executes condition determination (step S136). For example, the synchronous processing unit 93 determines whether or not the target user information included in the master database satisfies any condition of the second condition to the fifth condition illustrated in FIG. 3 or FIG. 4.

In a case where the second condition is satisfied (the nonexistence and the validness), the synchronous processing unit 93 instructs the user information update unit 94 to add new user information (step S137). In a case where the instruction of adding the new user information is received, the user information update unit 94 adds (newly registers) the new user information to the user table (step S138). In this case, the user information which is newly added to the user table, the values of items other than the user ID are identical to those of the target user information of the master database.

In a case where the third condition is satisfied (the nonexistence and the invalidness), the synchronous processing unit 93 does not execute any processing.

In a case where the fourth condition is satisfied (the existence and the validness), the synchronous processing unit 93 instructs the user information update unit 94 to overwrite the user information (step S139). In a case where the instruction of overwrite is received, the user information update unit 94 overwrites the corresponding user information of the user table with the target user information of the master database (step S140).

In the fifth condition, the update processing is different between the first rule information of FIG. 3 and the second rule information of FIG. 4. In a case where the first rule information of FIG. 3 is set, and the fifth condition is satisfied (the existence, the invalidness, and the deletion of a rule), the synchronous processing unit 93 instructs the user information update unit 94 to delete the user information (step S141). In a case where the instruction of deletion is received, the user information update unit 94 deletes the corresponding user information of the user table (step S142). In a case where the first rule information of FIG. 3 is set, and the fifth condition is satisfied, the synchronous processing unit 93 instructs the card information update unit 95 to delete the card information which is associated with the deleted user information (step S143). In a case where the instruction of deletion is received, the card information update unit 95 deletes the card information which is associated with the deleted user information (step S144).

In a case where the second rule information of FIG. 4 is set, and the fifth condition is satisfied (the existence, the invalidness, and the invalidness of the rule), the synchronous processing unit 93 instructs the user information update unit 94 to set the user information to be invalid (step S145). In a case where the instruction of invalidation, the user information update unit 94 sets the corresponding user information of the user table to be invalid (step S146). In a case where the second rule information of FIG. 4 is set, and the fifth condition is satisfied, the synchronous processing unit 93 instructs the card information update unit 95 to delete the card information associated with the user information which is set to be invalid (step S147). In a case where the instruction of deletion is received, the card information update unit 95 deletes the card information associated with the user information which is set to be invalid (step S148).

In a case where the processing of step S135 is executed with respect to all of the plurality of user information items included in the master database, the synchronous processing unit 93 ends the loop processing.

Subsequently, the synchronous processing unit 93 extracts the user information which exists in the user table and does not exist in the master database (step S149). That is, the synchronous processing unit 93 extracts the user information which satisfies the first condition illustrated in FIG. 3 and FIG. 4. In a case where the user information satisfying the first condition is extracted, the synchronous processing unit 93 imparts a deletion instruction with respect to the all of the extracted user information items to the user information update unit 94 (step S150). In a case where the deletion instruction with respect to all of the extracted user information items is received, the user information update unit 94 deletes all of the extracted user information items from the user table (step S151).

In a case where the user information satisfying the first condition is extracted, the synchronous processing unit 93 imparts the deletion instruction of the card information which is associated with all of the extracted user information items to the card information update unit 95 (step S152). In a case where the deletion instruction with respect to the card information which is associated with all of the extracted user information items is received, the card information update unit 95 deletes the card information which is associated with all of the extracted user information items from the card table (step S153).

As described above, the authentication system 10 according to this embodiment synchronizes the user information which is stored in the user information storage unit 81 with the user information which is stored in the master database according to the rule information. Therefore, according to the authentication system 10, it is possible to control a plurality of update methods with respect to the registration information at the time of performing the synchronous processing with respect to the registration information which is stored.

In the authentication system 10, in a case where the user information is set to be deleted or invalid, the card information associated with the user information which is set to be deleted or invalid is also deleted along with the user information. For example, in a case where the card information is manually deleted, a labor hour for specifying the user information which is set to be deleted or invalid and for retrieving and extracting the card information which is associated with the specified user information is generated. This is because only the minimum information (for example, the login user name) required for being associated with the user information is included in the card information, and information of whether the user information is set to be deleted or invalid is not included in the card information. In the authentication system 10 according to this embodiment, in a case where the user information is synchronized with the master database, the card information is also automatically updated, and thus, it is not necessary to manually update the card information, and it is possible to decrease the labor hour of the administrator.

Second Embodiment

Next, the authentication system 10 according to a second embodiment will be described. The authentication system 10 according to the second embodiment has approximately the same function and the same configuration as those of the first embodiment, and thus, the detailed description except for a difference will be omitted by applying the same reference numerals to blocks having approximately the same function and the same configuration. The same applies to a third embodiment and the like.

Figure 9:
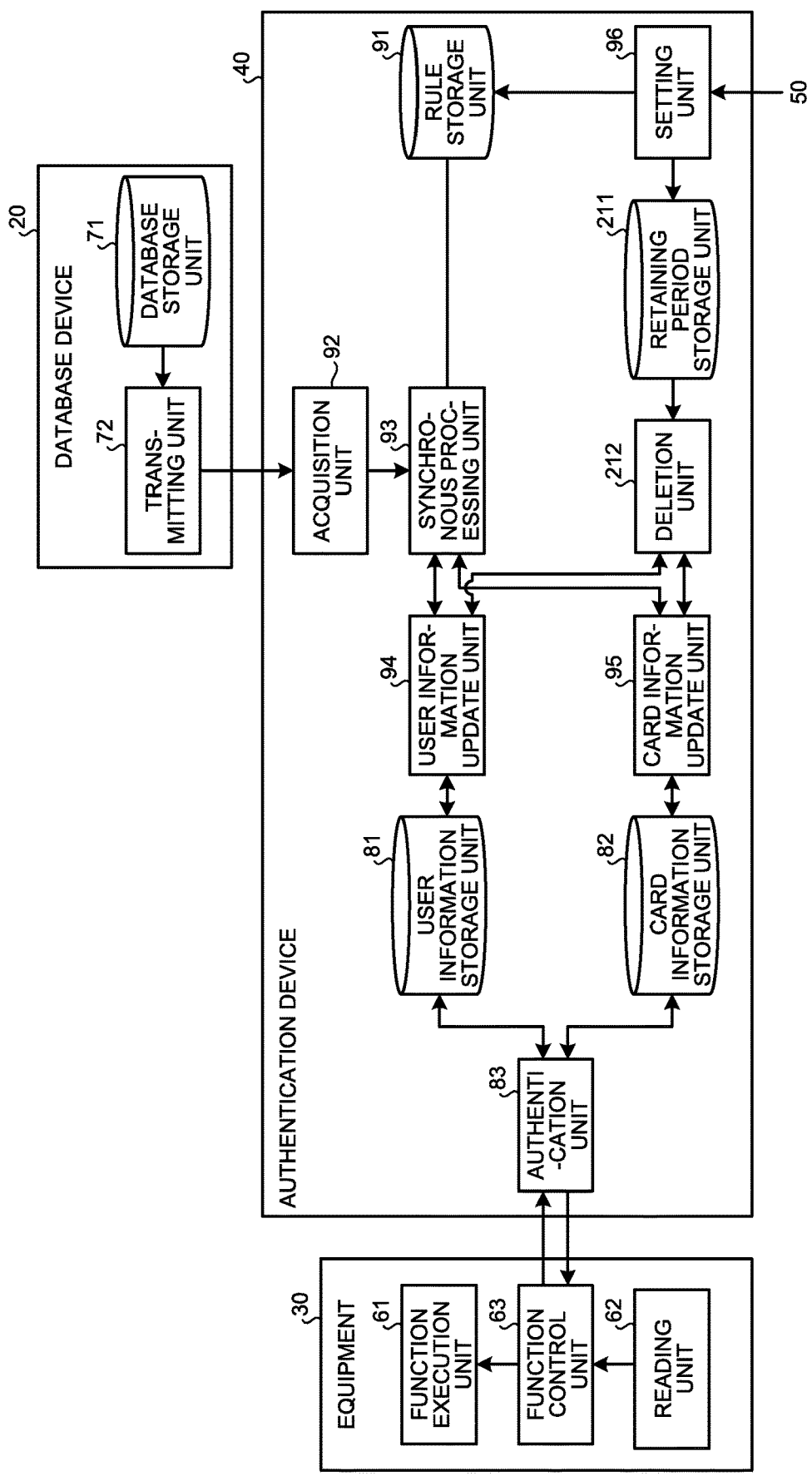
FIG. 9 is a diagram illustrating function configurations of an equipment, a database device, and an authentication device (an information processing apparatus) according to a second embodiment.

FIG. 9 is a diagram illustrating function configurations of the equipment 30, the database device 20, and the authentication device 40 according to the second embodiment. The authentication device 40 according to this embodiment further includes a retaining period storage unit 211 and a deletion unit 212.

The retaining period storage unit 211 stores a retaining period for retaining the user information which is set to be invalid. The setting unit 96 sets the retaining period according to the instruction from the administrator device 50, and stores the retaining period in the retaining period storage unit 211.

The user information storage unit 81 stores the user information as shown in Table 8 and Table 9 described below with respect to each of the users. Table 8 shows information items included in the user information which is stored in the user table. Table 9 shows a specific example of the user information which is stored in the user table.

TABLE 8

| Item name | Description |
|---|---|
| User ID | Number capable of uniquely identifying user information |

TABLE 8-continued

| Item name | Description |
|---|---|
| User logon name | User name to be input at time of performing authentication |
| Password | Password to be input at time of performing authentication |
| Display name | User name displayed on UI |
| E-mail transmission destination | E-mail address |
| Valid flag | Represent whether user information is valid or invalid. |
| Invalidation date and time | Date and time of invalidation |

TABLE 9

| User ID | User logon name | Password | Display name | E-mail transmission destination | Valid flag | Invalidation date and time |
|---|---|---|---|---|---|---|
| 0001 | usera | 12345678 | User-A | User-A@kaisha.com | ON | |
| 0002 | userb | 87654321 | User-B | User-B@kaisha.com | OFF | 2016 Mar. 31 |
| 0003 | userc | abcdefgh | User-C | User-C@Kaisha.com | ON | |
| ... | | | | | | |

As shown in Table 8 and Table 9, the user information which is stored in the user table further includes an invalidation date and time. The invalidation date and time represents a date and time in which the user information is set to be invalid, that is, a date and time in which the valid flag is turned off.

The deletion unit 212 deletes the user information which passes through the set retaining period from a time point of setting the user information to be invalid among the user information items which are set to be invalid and are stored in the user table of user information storage unit 81. The deletion unit 212 deletes the card information which is associated with the deleted user information from the card table which is stored in the card information storage unit 82.

Figures 10, 11:
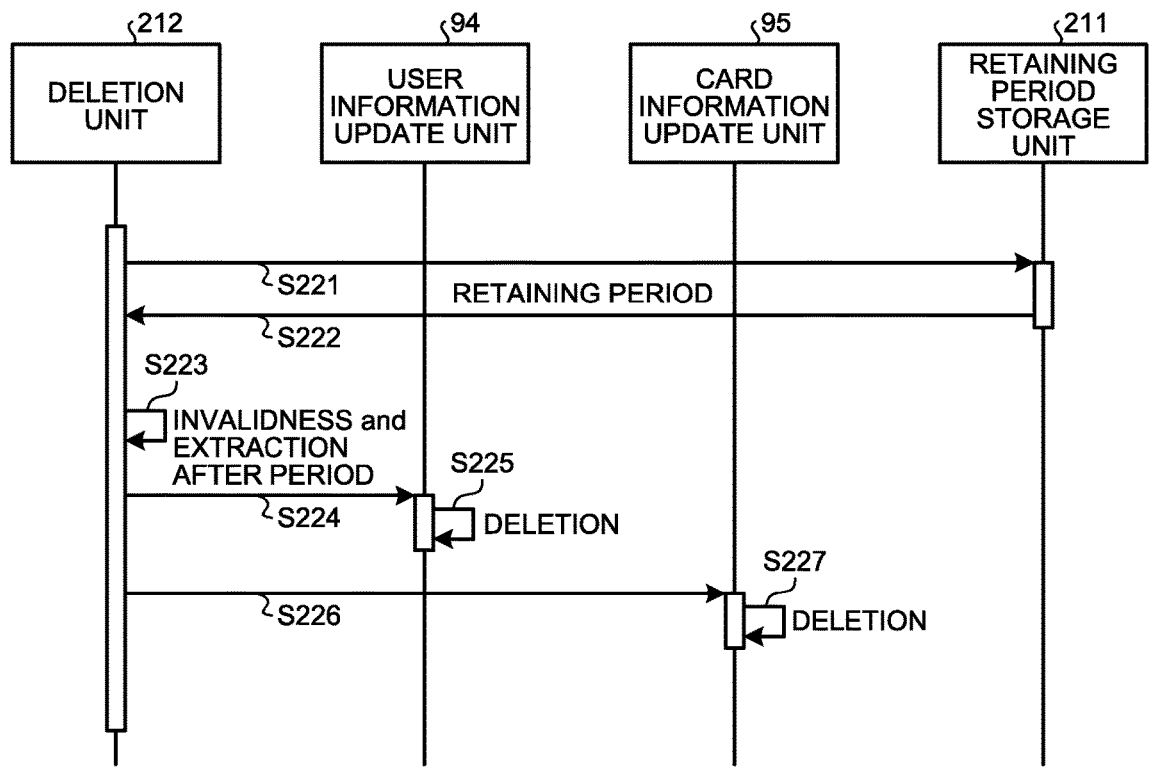
FIG. 10 is a sequence diagram illustrating a flow at the time of performing deletion processing with respect to user information.
FIG. 11 is a diagram illustrating an example of rule information for updating card information according to a third embodiment.

FIG. 10 is a sequence diagram illustrating a flow at the time of performing deletion processing with respect to the user information. The authentication device 40 executes the deletion processing in the sequence illustrated in FIG. 10 periodically or at a timing which is designated by the administrator.

First, the deletion unit 212 accesses the retaining period storage unit 211, and acquires the retaining period which is set by the setting unit 96 (step S221 and step S222). Subsequently, the deletion unit 212 extracts the user information which passes through the retaining period from the invalidation date and time among user information items which are set to be invalid (user information items of which the valid flag is turned off) and are stored in the user table (step S223).

Subsequently, the deletion unit 212 imparts the deletion instruction with respect to all of the extracted user information items to the user information update unit 94 (step S224). In a case where the deletion instruction is received, the user information update unit 94 deletes all of the extracted user information items from the user table (step S225).

The deletion unit 212 imparts the deletion instruction of the card information which is associated with all of the extracted user information items to the card information update unit 95 (step S226). In a case where the deletion instruction is received, the card information update unit 95 deletes the card information which is associated with all of the extracted user information items from the card table (step S227).

As described above, in the authentication system 10 according to this embodiment, the user information is retained during a certain period from setting the user information to be invalid, and in the case of passing the certain period from setting the user information to be invalid, it is possible to delete the user information.

Third Embodiment

Next, the authentication system 10 according to a third embodiment will be described.

FIG. 11 is a diagram illustrating an example of rule information for updating card information according to a third embodiment. In the third embodiment, the rule storage unit 91 stores the rule information for updating the card information, as illustrated in FIG. 11.

In the first section of the rule information illustrated in FIG. 11, a condition is represented in which the user information of the user table is deleted. An update method in the case of satisfying the first condition, represents that the card information which is associated with the deleted user information is set to be invalid.

In the second section of the rule information illustrated in FIG. 11, a condition is represented in which the user information of the user table is set to be invalid. An update method in the case of satisfying the second condition, represents that the card information which is associated with the deleted user information is set to be invalid.

The card information storage unit 82 stores the card information as shown in Table 10 and Table 11 described below, with respect to each of the cards 31. Table 10 shows information items included in the card information which is stored in the card table. Table 11 shows a specific example of the card information which is stored in the card table.

TABLE 10

| Item Name | Description |
|---|---|
| Card ID | Number capable of uniquely identifying card |
| Login user name | User logon name included in user information associated with card information |
| Start date of use | Start date of validity period |
| End date of use | End date of validity period |
| State flag | Represent whether card information is valid or invalid |

TABLE 11

| Card ID | Login user name | Start date of use | End date of use | State flag |
|---|---|---|---|---|
| 0001 | usera | 1990 Apr. 1 | 2016 Mar. 31 | valid |
| 0002 | userb | 1970 Apr. 1 | 2007 Mar. 31 | invalid |
| 0003 | userc | 2000 Apr. 1 | 2016 Mar. 31 | valid |
| ... | | | | |

As shown in Table 10 and Table 11, the card information which is stored in the card table further includes a state flag. The state flag represents whether the card information is valid or invalid. In a case where the card information is invalid, the corresponding card 31 is not authenticated.

In a case where the rule information as illustrated in FIG. 11 is set by the setting unit 96, the synchronous processing unit 93 executes the update processing with respect to the card information which is stored in the card information storage unit 82 according to the rule information illustrated in FIG. 11 at the time of performing the synchronization.

Figure 12:
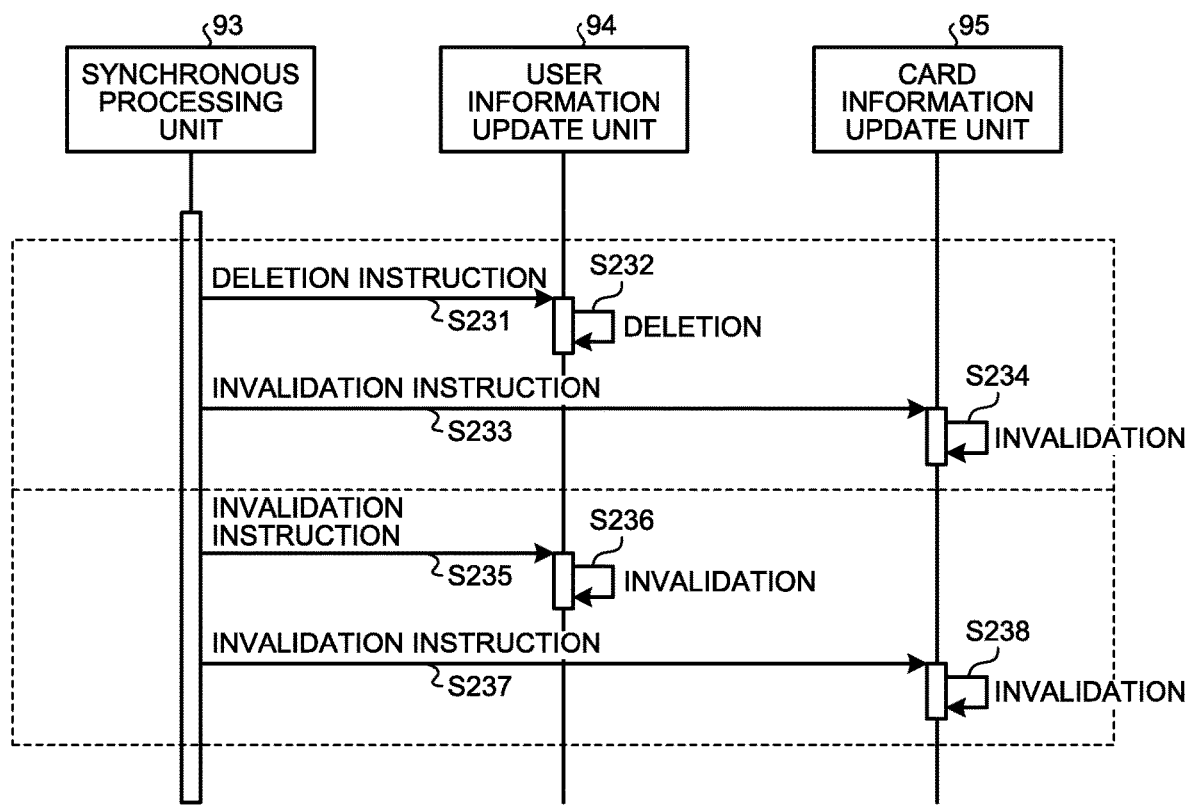
FIG. 12 is a sequence diagram illustrating a flow of update processing of the card information in the third embodiment.

FIG. 12 is a sequence diagram illustrating the flow of the update processing of the card information in the third embodiment. In a case where the rule information as illustrated in as illustrated in FIG. 11 is set, the synchronous processing unit 93 executes the update processing of the user information at the time of performing the synchronous processing, and as illustrated in FIG. 12, updates the card information.

That is, the synchronous processing unit 93 imparts the deletion instruction of the user information to the user information update unit 94 (step S231), and according to this instruction, the user information update unit 94 sets the instructed user information to be deleted (step S232). In this case, the first condition of the rule information illustrated in FIG. 11 is satisfied, and thus, the synchronous processing unit 93 imparts an invalidation instruction of the card information which is associated with the deleted user information to the card information update unit 95 (step S233). Then, the card information update unit 95 sets the instructed card information to be invalid according to the reception of the invalidation instruction (step S234). Specifically, the card information update unit 95 sets the value of the state flag which is included in the instructed card information to be invalid.

The synchronous processing unit 93 imparts the invalidation instruction of the user information to the user information update unit 94 (step S235), and according to this instruction, the user information update unit 94 sets the instructed user information to be invalid (step S236). In this case, the second condition of the rule information illustrated in FIG. 11 is satisfied, and thus, the synchronous processing unit 93 imparts the invalidation instruction of the card information associated with the user information which is set to be invalid to the card information update unit 95 (step S237). Then, the card information update unit 95 sets the instructed card information to be invalid according to the reception of the invalidation instruction (step S238).

Thus, the authentication system 10 according to this embodiment sets the state of the card information associated with the user information which is set to be deleted or invalid. Therefore, according to the authentication system 10, even in a case where the user information is set to be deleted or invalid, the card information which is associated with the user information is not deleted, and thus, it is possible to associate new user information with the card information. Therefore, according to the authentication system 10, it is possible to effectively utilize the card 31. According to the authentication system 10, in a case where the user information which is set to be invalid is subsequently returned to a valid state, it is possible to associate again the user information which is returned to the valid state with the card information.

Fourth Embodiment

Next, the authentication system 10 according to a fourth embodiment will be described.

Figure 13:
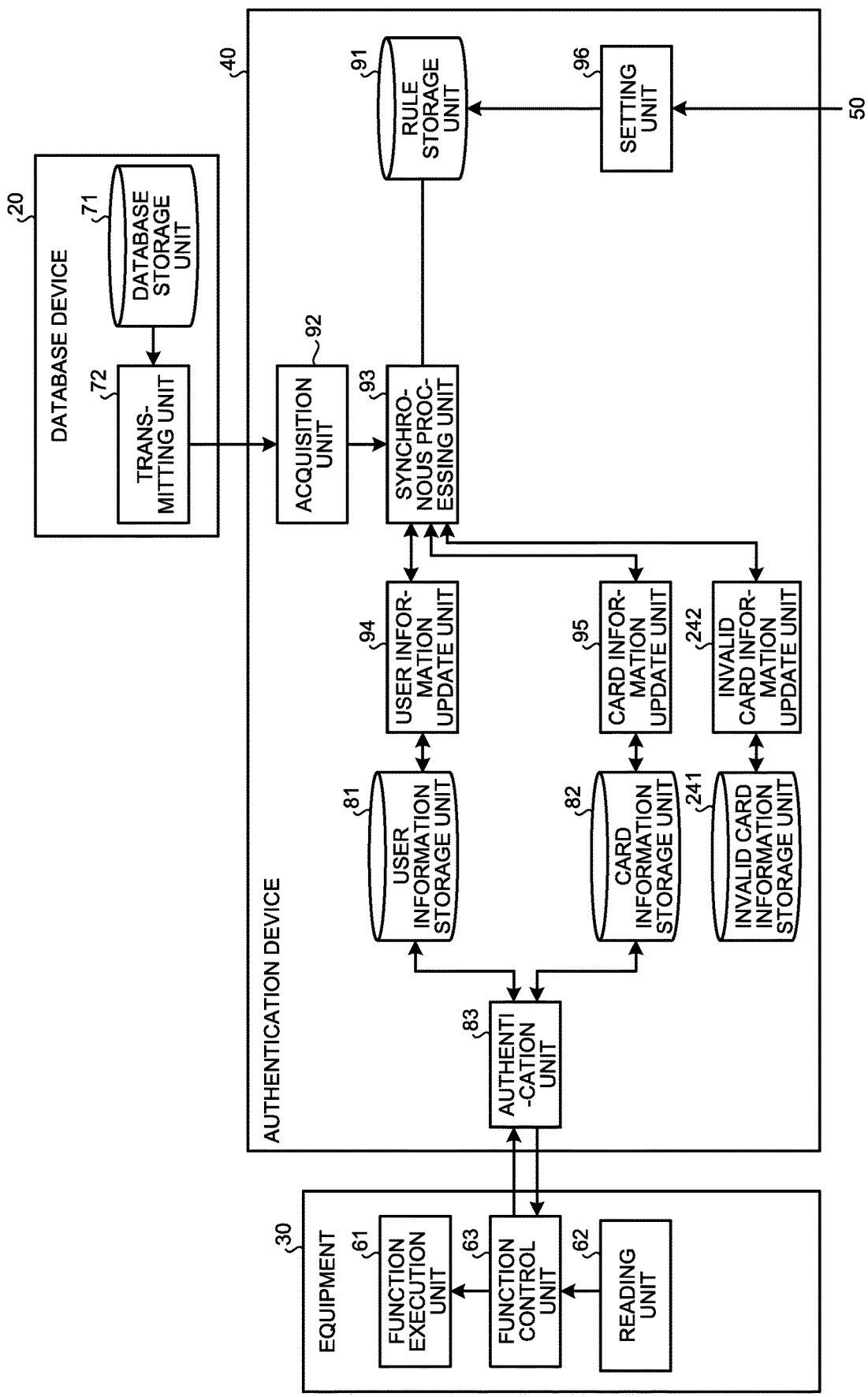
FIG. 13 is a diagram illustrating function configurations of an equipment, a database device, and an authentication device (an information processing apparatus) according to a fourth embodiment.

FIG. 13 is a diagram illustrating function configurations of the equipment 30, the database device 20, and the authentication device 40 according to a fourth embodiment. The authentication device 40 according to this embodiment further includes an invalid card information storage unit 241 (an invalid device information storage unit) and an invalid card information update unit 242.

The invalid card information storage unit 241 stores an invalid card table. The invalid card table stores the card information with respect to each of the cards 31 which is set to be invalid. The invalid card table stores the card information including the items shown in Table 5 and Table 6. The invalid card information update unit 242 updates the card information which is stored in the invalid card information storage unit 241 according to the instruction from the synchronous processing unit 93.

FIG. 14 is a diagram illustrating an example of the rule information for updating the card information according to the fourth embodiment. In the fourth embodiment, the rule storage unit 91 stores the rule information for updating the card information as illustrated in FIG. 14.

In the first section of the rule information illustrated in FIG. 14, a condition is represented in which the user information of the user table is deleted. An update method in the case of satisfying the first condition, represents that the card information which is associated with the deleted user information is moved from the card table to the invalid card table.

In the second section of the rule information illustrated in FIG. 14, a condition is represented in which the user information of the user table is set to be invalid. An update method in the case of satisfying the second condition, represents that the card information which is associated with the deleted user information is moved from the card table to the invalid card table.

In a case where the rule information as illustrated in FIG. 14 is set by the setting unit 96, the synchronous processing unit 93 executes the update processing with respect to the card information which is stored in the card information storage unit 82 and the invalid card information storage unit 241 according to the rule information illustrated in FIG. 14 at the time of performing the synchronization.

Figure 15:
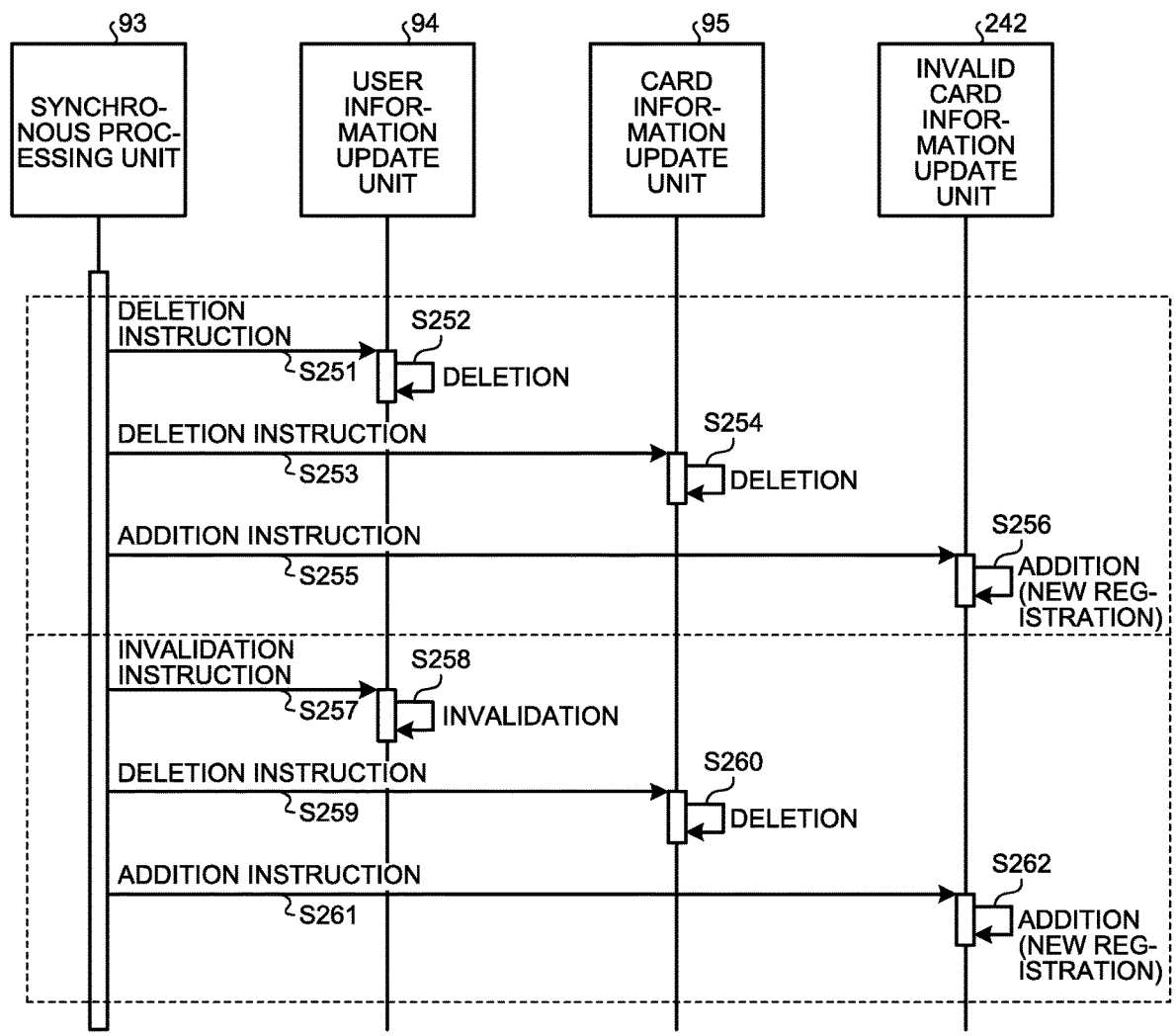
FIG. 15 is a sequence diagram illustrating a flow of update processing of the card information in the fourth embodiment.

FIG. 15 is a sequence diagram illustrating the flow of the update processing of the card information in the fourth embodiment. In a case where the rule information as illustrated in FIG. 14 is set, the synchronous processing unit 93 executes the update processing of the user information at the time of performing the synchronous processing, and as illustrated in FIG. 15, updates the card information.

That is, the synchronous processing unit 93 imparts the deletion instruction of the user information to the user information update unit 94 (step S251), and according to this instruction, the user information update unit 94 deletes the instructed user information (step S252). In this case, the first condition of the rule information illustrated in FIG. 14 is satisfied, and thus, the synchronous processing unit 93 moves the card information which is associated with the deleted user information from the card table to the invalid card table.

Specifically, the synchronous processing unit 93 imparts the deletion instruction of the card information which is associated with the deleted user information to the card information update unit 95 (step S253). The card information update unit 95 deletes the instructed card information according to the reception of the deletion instruction (step S254). Subsequently, the synchronous processing unit 93 imparts an addition instruction of the card information to the invalid card information update unit 242 (step S255). The invalid card information update unit 242 adds (newly registers) the card information which is deleted from the card table to the invalid card table which is stored in the invalid card information storage unit 241, according to the reception of the addition instruction (step S256).

The synchronous processing unit 93 imparts the invalidation instruction of the user information to the user information update unit 94 (step S257), and according to this instruction, the user information update unit 94 sets the instructed user information to be invalid (step S258). In this case, the second condition of the rule information illustrated in FIG. 14 is satisfied, and thus, the synchronous processing unit 93 moves the card information associated with the user information which is set to be invalid, from the card table to the invalid card table.

Specifically, the synchronous processing unit 93 imparts the deletion instruction of the card information associated with the user information which is set to be invalid to the card information update unit 95 (step S259). The card information update unit 95 deletes the instructed card information according to the reception of the deletion instruction (step S260). Subsequently, the synchronous processing unit 93 imparts the addition instruction of the card information to the invalid card information update unit 242 (step S261). The invalid card information update unit 242 adds (newly registers) the card information which is deleted from the card table to the invalid card table which is stored in the invalid card information storage unit 241 according to the reception of the addition instruction (step S262).

Thus, the authentication system 10 according to this embodiment moves the card information associated with the user information which is set to be deleted or invalid, from the card table to the invalid card table. In the card table which is stored in the card information storage unit 82, valid card information (which is associated with the user information) is stored. In the invalid card table which is stored in the invalid card information storage unit 241, invalid card information (which is not associated with the user information) is stored.

Accordingly, according to the authentication system 10, even in a case where the user information is set to be deleted or invalid, the card information which is associated with the user information is not deleted, and thus, it is possible to associate new user information with the card information to effectively utilize the card 31. According to the authentication system 10, in a case where the user information which is set to be invalid is subsequently returned to a valid state, it is possible to associate again the user information which is returned to the valid state with the card information. According to the authentication system 10, the valid card information and the invalid card information are separately stored in the table, and thus, it is possible to easily perform the retrieving.

Modification Example

Figure 16:
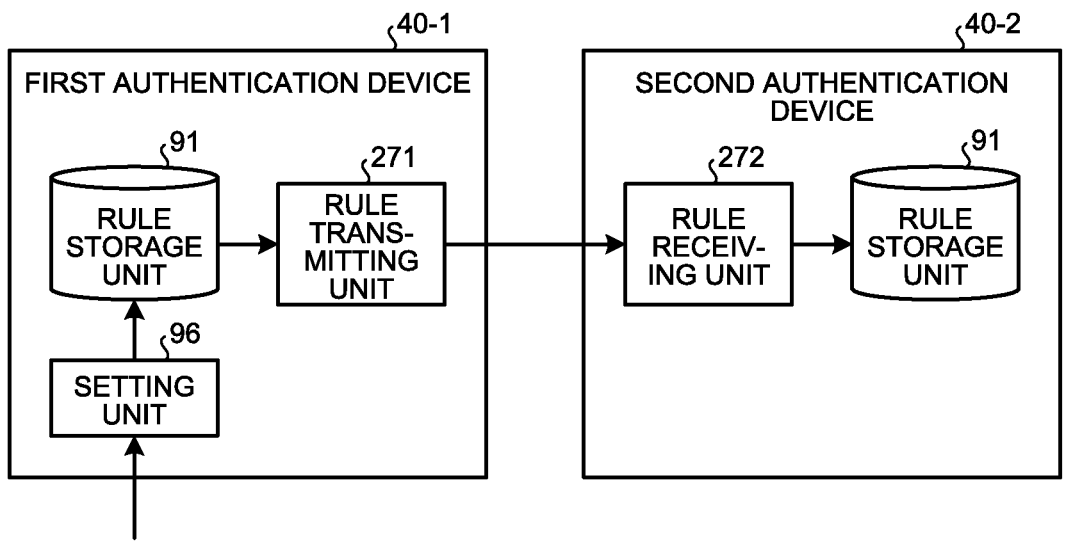
FIG. 16 is a diagram illustrating a function configuration of an authentication device (a first authentication device and a second authentication device) according to a modification example of the first embodiment to the fourth embodiment.

FIG. 16 is a diagram illustrating a function configuration of an authentication device 40 (a first authentication device 40-1 and a second authentication device 40-2) according to a modification example of the first embodiment to the fourth embodiment.

The authentication systems 10 according to the first embodiment to the fourth embodiment may include a plurality of authentication devices 40. Each of the authentication devices 40 provides the authentication processing with respect to the equipment 30. Even in a case where any one of the authentication devices 40 is broken, such authentication systems 10 are capable of providing the authentication processing by the other authentication device 40.

The first authentication device 40-1 which becomes a master among the plurality of authentication devices 40, further includes a rule transmitting unit 271. The second authentication device 40-2 (the other device) which becomes the other than the master among the plurality of authentication devices 40, further includes a rule receiving unit 272. The second authentication device 40-2 does not include the setting unit 96.

The rule transmitting unit 271 of the first authentication device 40-1 transmits the rule information which is stored in the rule storage unit 91 to the second authentication device 40-2. The rule receiving unit 272 of the second authentication device 40-2 receives the rule information from the first authentication device 40-1, and stores the received rule information in the rule storage unit 91.

In a case where such an authentication system 10 according to the modification example includes a plurality of authentication devices 40, and the rule information is set in any one of the authentication devices 40, it is possible to export the rule information to the other authentication device. Therefore, according to the authentication system 10 according to the modification example, it is possible to reduce a labor hour for setting the rule information in each of the plurality of authentication devices 40.

Hardware Configuration and the Like

Figure 17:
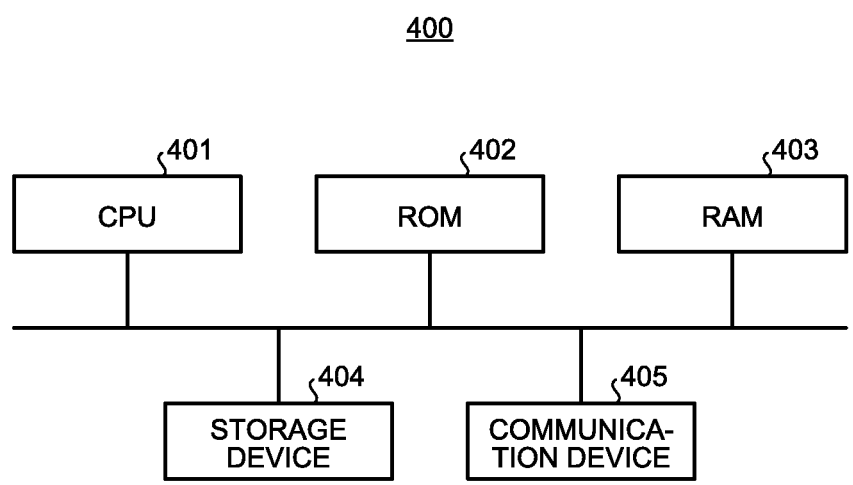
FIG. 17 is a diagram illustrating a hardware configuration of the information processing apparatus.

FIG. 17 is a diagram illustrating a hardware configuration of an information processing apparatus 400. The authentication device 40, for example, is realized by the information processing apparatus 400 having the same configuration as that of a usual computer, as illustrated in FIG. 17. That is, the information processing apparatus 400 includes a central processing unit (CPU) 401, a read only memory (ROM) 402, a random access memory (RAM) 403, a storage device 404, and a communication device 405. The CPU 401, the ROM 402, the RAM 403, the storage device 404, and the communication device 405 are connected to each other by a bus.

The CPU 401 expands and executes a program which is stored in the storage device 404 in the RAM 403, and performs input and output by controlling each unit, or performs data processing. The ROM 402 stores a start program which reads a program for activating an OS from the storage device 404 into the RAM 403. The RAM 403 is a memory which functions as a working area of the CPU 401.

The storage device 404, for example, is a hard disk drive, a flash memory, or the like. The storage device 404 stores an operating system, an application program, and data. The program is distributed by being recorded in a recording medium which can be read by a computer as a file in an installable format or an executable format. The program may be distributed by being downloaded from a server. The communication device 405, for example, is an interface device for connection to a network.

The program which is executed by the information processing apparatus 400 of this embodiment is provided by being recorded in a recording medium which can be read by a computer as a file in an installable format or an executable format, such as a CD-ROM, a flexible disk (FD), CD-R, and a DVD.

The program which is executed by the information processing apparatus 400 of this embodiment may be configured to be stored on a computer which is connected to a network such as the internet, and to be provided by being downloaded through the network. The program which is executed by the information processing apparatus 400 of this embodiment may be configured to be provided or distributed through the network such as the internet. The program of this embodiment may be configured to be provided by being incorporated in advance in the ROM 402 or the like.

The program for allowing the information processing apparatus 400 to function as the authentication device 40 includes an authentication module, an acquisition module, a synchronous processing module, a user information update module, a card information update module, and a setting module. In the information processing apparatus 400, a processor (the CPU 401) reads the program from a storage medium (the storage device 404 or the like) and executes the read program, and thus, each of the units described above is loaded on a main storage device (the RAM 403), and the processor functions as the authentication unit 83, the acquisition unit 92, the synchronous processing unit 93, the user information update unit 94, the card information update unit 95, and the setting unit 96, as actual hardware. The main storage device or the store medium functions as the user information storage unit 81, the card information storage unit 82, and the rule storage unit 91.

According to the exemplary embodiments of the present invention, it is possible to control a plurality of update methods with respect to registration information at the time of performing synchronous processing with respect to registration information which is stored.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus, comprising:
a memory storing computer-readable instructions; and
one or more processors configured to execute the computer-readable instructions such that the one or more processors are configured to perform operations including,
acquiring registration information which is stored in a master database;
the memory being configured to store the registration information and configured to store rule information representing an update method for synchronizing the registration information which is stored in the memory with the registration information which is stored in the master database; and
the one or more processors are further configured to update the registration information stored in the memory based on the acquired registration information and rule information which are stored in the master database, wherein
the memory stores device information associated with a portable device, and the device information is associated with at least one item of user information,
the portable device is carried by a user, and records the device information,
an equipment transmits the device information acquired from the portable device to the one or more processors by including the device information in an authentication request, and
the one or more processors updates corresponding device information which is stored in the memory according to the update of the user information which is stored in the memory.

2. The information processing apparatus according to claim 1, wherein
the registration information includes a valid flag representing whether information to be included is valid or invalid,
in a case where the registration information exists in the master database and the memory, and the valid flag included in the registration information which is stored in the master database is invalid, the rule information represents that the valid flag included in the registration information of the memory is set to be invalid, and
in a case where the registration information exists in the master database and the memory, and the valid flag included in the registration information which is stored in the master database is invalid, the one or more processors sets the valid flag included in corresponding registration information of the memory to be invalid.

3. The information processing apparatus according to claim 1, wherein the one or more processors are further configured
to set the rule information according to an operation,
wherein the one or more processors updates the registration information which is stored in the memory based on the rule information which is set by the one or more processors.

4. The information processing apparatus according to claim 3, wherein
the registration information includes a valid flag representing whether information to be included is valid or invalid, and
the one or more processors selects any one of
first rule information representing that the registration information of the memory is deleted, in a case where the registration information exists in the master database and the memory, and the valid flag included in the registration information which is stored in the master database is invalid, and
second rule information representing that the valid flag included in corresponding registration information of the memory is set to be invalid, in a case where the registration information exists in the master database and the memory, and the valid flag included in the registration information which is stored in the master database is invalid, according to the operation.

5. The information processing apparatus according to claim 1, wherein
the master database and the memory store the user information for authenticating a user using an equipment, as the registration information.

6. The information processing apparatus according to claim 5, wherein the one or more processors are further configured to receive the authentication request including the user information or information associated with the user information from the equipment, authenticating the information included in the received authentication request based on the user information stored in the memory, and transmitting an authentication result representing whether or not a user using the equipment is proper to the equipment.

7. The information processing apparatus according to claim 1, wherein the one or more processors are further configured to delete the user information which passes through a set period from a time point of setting the user information to be invalid, among user information items which are invalid and are stored in the memory.

8. The information processing apparatus according to claim 1, wherein
the device information includes a state flag representing whether the portable device is valid or invalid, and
in a case where the user information which is stored in the memory is set to be deleted or invalid, the one or more processors sets the state flag included in corresponding device information which is stored in the memory to be invalid.

9. The information processing apparatus according to claim 1, wherein the one or more processors are further configured to transmit the rule information which is stored in the memory to the other device.

10. The information processing apparatus according to claim 1, wherein the one or more processors are further configured to receive the rule information from the other device and cause the memory to store the rule information.

11. A non-transitory computer-readable recording medium that contains a computer program that is implemented in an information processing apparatus including a processor, a registration information storage, a device information storage configured to store device information associated with a portable device and at least one item of user information, and a rule storage, the computer program causes the processor to execute:
acquiring registration information which is stored in a master database;

acquiring rule information representing an update method for synchronizing the registration information which is stored in the registration information storage with the registration information which is stored in the master database from the rule storage, updating the registration information which is stored in the registration information storage based on the acquired registration information and the acquired rule information which are stored in the master database, an equipment transmits device information acquired from a portable device that records the device information and is carried by a user to an authenticator of the information processing apparatus by including the device information in an authentication request, and updating stored corresponding device information according to an update of user information which is stored in the registration information.

12. An update method for an information processing apparatus including a processor, a registration information storage, a device information storage configured to store device information associated with a portable device and at least one item of user information, and a rule storage, the method comprising:

acquiring, by the processor, registration information which is stored in a master database;

acquiring, by the processor, rule information representing an update method for synchronizing the registration information which is stored in the registration information storage with the registration information which is stored in the master database from the rule storage, updating, by the processor, the registration information which is stored in the registration information storage based on the acquired registration information and the acquired rule information which are stored in the master database, an equipment transmits device information acquired from a portable device that records the device information and is carried by a user to an authenticator of the information processing apparatus by including the device information in an authentication request, and updating stored corresponding device information according to an update of user information which is stored in the registration information.

\* \* \* \* \*